(12) United States Patent
Bale et al.

(10) Patent No.: US 12,692,775 B2
(45) Date of Patent: Jul. 28, 2026

(54) ESTIMATION OF PIPE FRICTION AND STAGE RESISTANCE BASED ON PRESSURE TEMPORAL GRADIENT

(71) Applicant: Halliburton Energy Services, Inc., Houston, TX (US)

(72) Inventors: Derek Shelby Bale, Houston, TX (US); Zhijie Sun, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/039,669

(22) Filed: Jan. 28, 2025

(65) Prior Publication Data

US 2025/0369326 A1     Dec. 4, 2025

Related U.S. Application Data

(60) Provisional application No. 63/654,764, filed on May 31, 2024, provisional application No. 63/653,296, filed on May 30, 2024.

(51) Int. Cl.
| | |
|---|---|
| *E21B 43/26* | (2006.01) |
| *E21B 47/06* | (2012.01) |
| *G01V 1/50* | (2006.01) |

(52) U.S. Cl.
CPC .............. *E21B 43/26* (2013.01); *E21B 47/06* (2013.01); *G01V 1/50* (2013.01); *G01V 2210/624* (2013.01)

(58) Field of Classification Search
CPC ...... G01V 1/50; G01V 1/48; G01V 2210/646; G01V 2210/1234; G01V 1/40; E21B 43/26; E21B 49/008; E21B 47/06; E21B 2200/20
See application file for complete search history.

(56) References Cited

U.S. PATENT DOCUMENTS

| | | |
|---|---|---|
| 10,253,599 B2 | 4/2019 | Dykstra et al. |
| 10,301,913 B2 | 5/2019 | Dykstra et al. |
| 10,323,499 B2 | 6/2019 | Dykstra et al. |
| 10,329,882 B2 | 6/2019 | Dykstra et al. |
| 10,794,168 B2 | 10/2020 | Dykstra et al. |
| 2016/0281489 A1 | 9/2016 | Dykstra et al. |
| 2016/0356127 A1 | 12/2016 | Dykstra et al. |

(Continued)

FOREIGN PATENT DOCUMENTS

| | | | | |
|---|---|---|---|---|
| CA | 3034253 C | * | 1/2021 | ............... G01V 1/50 |

OTHER PUBLICATIONS

SPE International, Constraints on Pipe Friction and Perforation Cluster Efficiency from Water Hammer Analysis, SPE-212337-MS, 202, The Woodlands, TX, 2023.

(Continued)

*Primary Examiner* — Zakiya W Bates
(74) *Attorney, Agent, or Firm* — Michael Jenney; C. Tumey Law Group PLLC

(57) ABSTRACT
A method for evaluating one or more properties of a wellbore. The method may include generating a tube wave in a wellbore, measuring a pressure created by the tube wave at a wellhead and creating a time-domain model based at least in part on the pressure. The method may further include identifying a Darcy factor and a stage resistance based at least in part on the time-domain model.

20 Claims, 9 Drawing Sheets

(56)  References Cited

U.S. PATENT DOCUMENTS

| | | | |
|---|---|---|---|
| 2017/0218728 | A1 | 8/2017 | Dykstra et al. |
| 2017/0306727 | A1 | 10/2017 | Dykstra et al. |
| 2017/0328179 | A1 | 11/2017 | Dykstra et al. |
| 2017/0342808 | A1 | 11/2017 | Dykstra et al. |
| 2020/0109627 | A1 | 4/2020 | Felkl et al. |
| 2022/0082004 | A1 | 3/2022 | Bannikov et al. |
| 2022/0252749 | A1 | 8/2022 | Quan et al. |
| 2023/0147476 | A1 | 5/2023 | Wheelock et al. |
| 2023/0399940 | A1 | 12/2023 | Rahimi-Aghdam et al. |

OTHER PUBLICATIONS

SAFA (Seismos Acoustic Friction Analysis), Spec Sheet, Accessed Jan. 24, 2025, https://www.seismos.com/SAFA.
Bale and Sun, Estimation of Pipe Friction and Stage Resistance based on Pressure Temporal Gradient, Apr. 19, 2024.
International Search Report and Written Opinion for International Patent Application No. PCT/US2025/016962 dated Jun. 5, 2025. PDF file. 9 pages.

* cited by examiner

ESTIMATION OF PIPE FRICTION AND STAGE RESISTANCE BASED ON PRESSURE TEMPORAL GRADIENT

CROSS REFERENCE TO RELATED APPLICATIONS

This application claims the priority of U.S. Provisional Patent Application No. 63/653,296, filed May 30, 2024, which is incorporated by reference in its entirety.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Subterranean operations involve a number of different steps such as, for example, drilling a wellbore at a desired well site, treating and stimulating the wellbore to optimize production of hydrocarbons, and performing the necessary steps to produce and process the hydrocarbons from the subterranean formation.

This disclosure relates to the field of seismic analysis and hydraulic fracture as well as hydraulic fracturing process monitoring and evaluation. In particular, monitoring hydraulic fracturing, currently, requires a large number of resources to evaluate downhole conditions via tube wave operations.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods using flow rate and surface pressure information to identify subsurface properties within a wellbore. To take measurements of subsurface properties within a wellbore, a tube wave may be generated within the wellbore. During measurement operations, a time series of measured pressure during a fracture treatment has embedded within it tube wave signatures that were excited by some operational process, for example a rapid ramp down of pumping rate. Methods and systems discussed below may extract from the tube wave signature the Darcy friction factor for the pipe, and an aggregate resistance imposed by the toe-end of the stage. The extracted friction factor and stage resistance, in turn, provide subsurface properties of the wellbore.

Methods and systems below discuss the use of generated and/or forced tube waves to interrogate subsurface conditions during hydraulic fracturing. The basic operating premise of the measurement is that a tube wave at the surface may propagate downhole and interact with the subsurface environment (i.e., perforations, fractures, and plugs) as it travels. The interactions result in acoustic reflections that travel back to the surface with subsurface information imprinted within the signal. That is, the reflected acoustic wave forms from the tube wave have altered amplitudes, phases, and features that result from their interactions with the subsurface system. These acoustic reflections are subsequently measured by surface sensors and processed to yield metrics that quantitatively represent the desired subsurface information.

Figure 1:
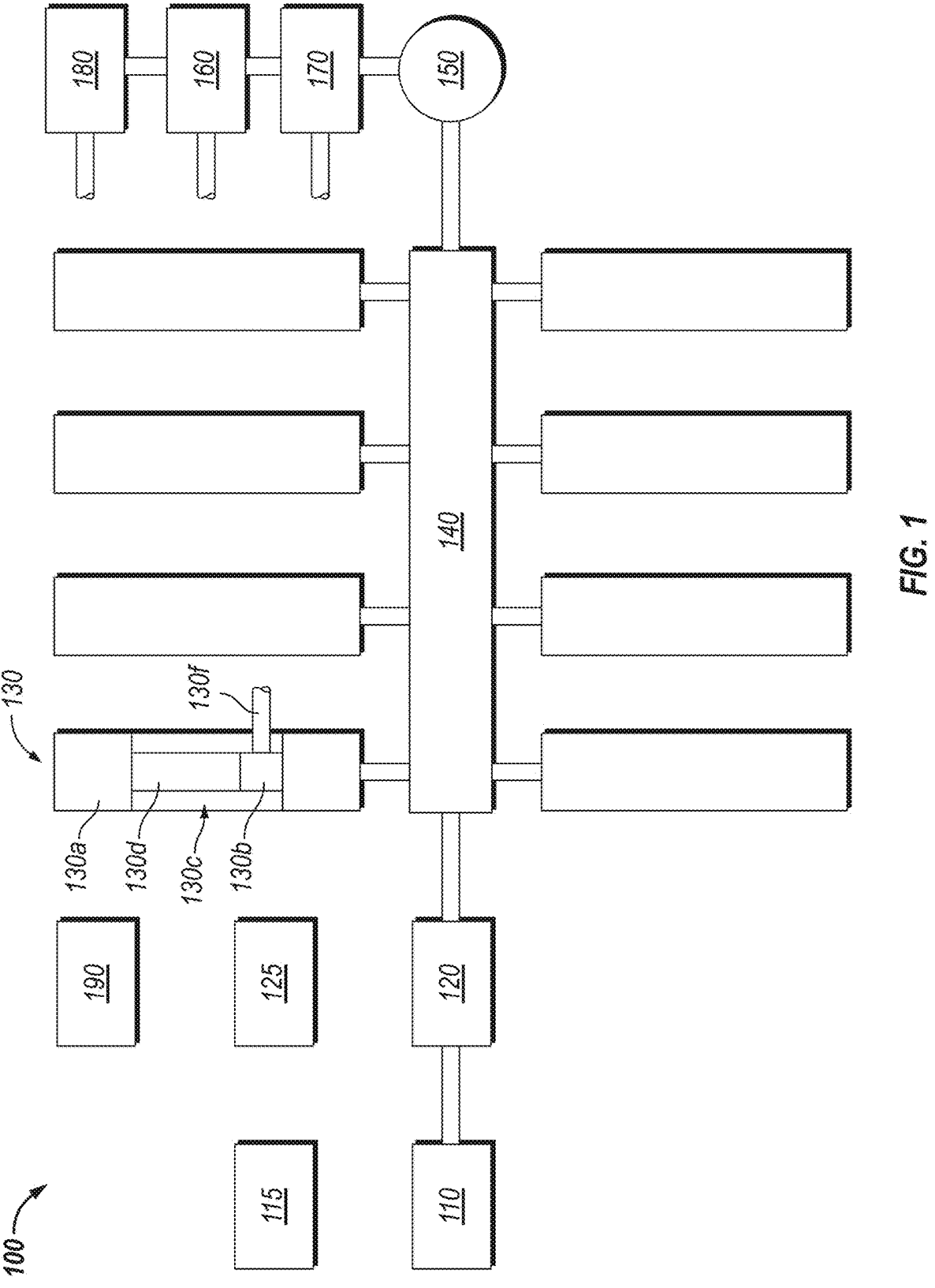
FIG. 1 is a diagram illustrating an example system for treatment operations, according to aspects of the present disclosure.

FIG. 1 is a diagram illustrating an example of a frac system 100 for treatment operations, according to aspects of the present disclosure. Frac system 100 may comprise a fluid management system 110 in fluid communication with a blender system 120. Blender system 120 may in turn be in fluid communication with one or more pumping systems 130 through a fluid manifold system 140. Fluid manifold system 140 may provide fluid communication between pumping systems 130 and a wellbore 150. It should be noted that wellbore 150 may comprise a plurality of tubulars disposed within a borehole. A tube wave may be formed within the tubulars and traverse the length of the tubulars in wellbore 150. In use, fluid management system 110 may receive water or another fluid from a fluid source 115 (e.g., a ground water source, a pond, one or more frac tanks), mix one or more fluid additives into the received water or fluid to produce a treatment fluid with a desired fluid characteristic, and provide the produced treatment fluid to blender system 120. Blender system 120 may receive the produced treatment fluid from fluid management system 110 and mix the produced treatment fluid with a proppant, such as sand, or another granular material 125 to produce a final treatment fluid that is directed to fluid manifold 140. Pumping systems 130 may then pressurize the final treatment fluid to generate pressurized final treatment fluid that is directed into wellbore 150, where the pressurized final treatment fluid generates fractures within a formation in fluid communication with wellbore 150.

An example one of pumping systems 130 may comprise a first mover 130a, a pump 130b, and a drive train 130c. As used herein, a mover may comprise any device that converts energy into mechanical energy to drive a pump. Example movers comprise, but are not limited to, electric pump motors, hydrocarbon-driven or steam engines, turbines, etc. Drive train 130c may be removably coupled to first mover 130a and pumps 130b through one or more drive shafts (not shown), and may comprise a transmission 130d with one or more gears that transmits mechanical energy from first mover to the pump 130b. For instance, to the extent pumps 130b comprise reciprocating pumps, the mechanical energy may comprise torque that drives pump 130b.

Drive train 130c may further comprise an electric pump motor 130e. As depicted, the electric pump motor 130e may be coupled to transmission 130d between transmission 130d and pump 130b. In the embodiment shown, electric pump motor 130e may receive mechanical energy from first mover 130a through transmission 130d and provide the received mechanical energy to pump 130b augmented by mechanical energy generated by electric pump motor 130e. It should be appreciated, however, that the orientation of electric pump motor 130e with respect to first mover 130a, transmission 130d, and the pump 130b is not limited to the embodiment shown. In other embodiments, electric pump motor 130e may be positioned between transmission 130d and first mover 130a, for instance, or between elements of transmission 130d itself. In yet other embodiments, electric pump motor 130e may be incorporated into transmission 130d as part of a hybrid transmission system through which power from both first mover 130a and electric pump motor 130e are provided to pump 130b.

First mover 130a and electric pump motor 130e may receive energy or fuel in one or more forms from sources at the wellsite. The energy or fuel may comprise, for instance, hydrocarbon-based fuel, electrical energy, hydraulic energy, thermal energy, etc. The sources of energy or fuel may comprise, for instance, on-site fuel tanks, mobile fuel tanks delivered to the site, electrical generators, hydraulic pumping systems, etc. First mover 130a and electric pump motor 130e may then convert the fuel or energy into mechanical energy that can be used to drive associated pump 130b.

In the embodiment shown, first mover 130a may comprise an internal combustion engine such as a diesel or dual fuel (e.g., diesel and natural gas) engine and electric pump motor 130e may comprise an electric pump motor. First mover 130a may receive a source of fuel from one or more fuel tanks (not shown) that may be located within the pumping system 130 and refilled as necessary using a mobile fuel truck driven on site. Electric pump motor 130e may be electrically coupled to a source of electricity through a cable 130f. Example sources of electricity comprise, but are not limited to, an on-site electrical generator, a public utility grid, one or more power storage elements, solar cells, wind turbines, other power sources, or one or more combinations of any of the previously listed sources.

As depicted, the source of electricity coupled electric pump motor 130e comprises a generator 160 located at the well site. The generator may comprise, for instance, a gas-turbine generator or an internal combustion engine that produces electricity to be consumed or stored on site. In the embodiment shown, generator 160 may receive and utilize natural gas from the wellbore 150 or from another wellbore in the field (i.e., "wellhead gas") to produce the electricity. As depicted, frac system 100 may comprise gas conditioning systems 170 that may receive the gas from wellbore 150 or another source and condition the gas for use in the generator 160. Example gas conditioning systems comprise, but are not limited to, gas separators, gas dehydrators, gas filters, etc. In other embodiments, conditioned natural gas may be transported to the well site for use by the generator.

Frac system 100 may further comprise one or more energy storage devices 180 that may receive energy generated by generator 160 or other on-site energy sources and store in one or more forms for later use. For instance, storage devices 180 may store the electrical energy from generator 160 as electrical, chemical, or mechanical energy, or in any other suitable form. Example storage devices 180 comprise, but are not limited to, capacitor banks, batteries, flywheels, pressure tanks, etc. In certain embodiments, energy storage devices 180 and generator 160 may be incorporated into a power grid located on site through which at least some of the fluid management system 110, blender system 120, pumping systems 130, and gas conditioning systems 170 may receive power.

In use, first mover 130a and electric pump motor 130e may operate in parallel or in series to drive pump 130b, with the division of power between the movers being flexible depending on the application. For instance, in a multi-stage well stimulation operation, the formation may be fractured (or otherwise stimulated) in one or more "stages," with each stage corresponding to a different location within the formation. Each "stage" may be accompanied by an "active" period during which pump 130b may be engaged and pressurized fluids are being pumped into wellbore 150 to fracture the formation, and an "inactive" period during which the pumps are not engaged while other ancillary operations are taking place. The transition between the "inactive" and "active" periods may be characterized by a sharp increase in torque requirement.

In an embodiment in which first mover 130a comprises a diesel engine and electric pump motor 130e comprises an electric pump motor, both the diesel engine and electric pump motor may be engaged to provide the necessary power, with the percentage contribution of each depending on the period in which frac system 100 is operating. For instance, during the "inactive" and "active" periods in which the torque requirements are relatively stable, the diesel engine, which operates more efficiently during low or near constant speed operations, may provide a higher percentage (or all) of the torque to the pump than the electric pump motor. In contrast, during transitions between "inactive" and "active" states, the electric pump motor may supplant the diesel engine as the primary source of torque to lighten the load on the diesel engine during these transient operations. In both cases, the electric pump motor reduces the torque required by the diesel engine, which reduces the amount of diesel fuel that must be consumed during the well stimulation operation. It should be noted that power sources could be used during continuous operation or intermittently as needed, including during transmission gear-shift events.

In addition to reducing the amount of diesel fuel needed to perform a well stimulation operation, the use of a first mover and an electric pump motor in a pumping system described herein may provide flexibility with respect to the types of movers that may be used. For instance, natural gas engines, i.e., internal combustion engines that use natural gas as their only source of combustion, are typically not used in oil field environments due to their limited torque capacity. By including two movers within pumping system 130, the torque capacity of the natural gas engine may be augmented to allow the use of a natural gas engine within pumping system 130. For instance, in certain embodiments, first mover 130a may comprise a natural gas engine and electric pump motor 130e may comprise an electric pump motor that operates in series or parallel with the natural gas engine to provide the necessary torque to power pump 130b.

In certain embodiments, pumping systems 130 may be electrically coupled to an information handling system 190 that directs the operation of first movers 130a and electric pump motors 130e of pumping systems 130. Information handling system 190 may further control at least a part of frac system 100. As illustrated, the information handling system 190 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 190 may be a personal computer, a network storage device, or any other suitable device and may vary in size, shape, performance, functionality, and price.

Information handling system 190 may comprise a processing unit (e.g., microprocessor, central processing unit, etc.) that may process data from electric pump motor 130*e*, discussed below, by executing software or instructions obtained from a local non-transitory computer readable media (e.g., optical disks, magnetic disks). The non-transitory computer readable media may store software or instructions of the methods described herein. Non-transitory computer readable media may comprise any instrumentality or aggregation of instrumentalities that may retain data and/or instructions for a period of time. Non-transitory computer readable media may comprise, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 190 may also comprise input device(s) (e.g., keyboard, mouse, touchpad, etc.) and output device(s) (e.g., monitor, printer, etc.). The input device(s) and output device(s) provide a user interface that enables an operator to interact with any device disposed or a part of frac system 100 and/or software executed by a processing unit.

For example, information handling system 190 may send one or more control signals to pumping systems 130 to control the speed/torque output of first movers 130*a* and electric pump motors 130*e*. The control signals may take whatever form is necessary to communicate with the first movers 130*a* and electric pump motors 130*e*. For example, a control signal to electric pump motor 130*e* may comprise an electrical control signal to a variable frequency drive (VFD), discussed below, coupled to electric pump motor 130*e*, which may receive the control signal and alter the operation of the electric pump motor based on the control signal.

In certain embodiments, information handling system 190 may also be electrically coupled to other elements of the system, including fluid management system 110, blender system 120, pumping systems 130, generator 160, and gas conditioning systems 170 in order to monitor and/or control the operation of frac system 100. In other embodiments, some or all of the functionality associated with information handling system 190 may be located on the individual elements of the system, e.g., each of pumping systems 130 may have individual controllers that direct the operation of the associated first mover 130*a* and electric pump motors 130*e*.

Figure 2:
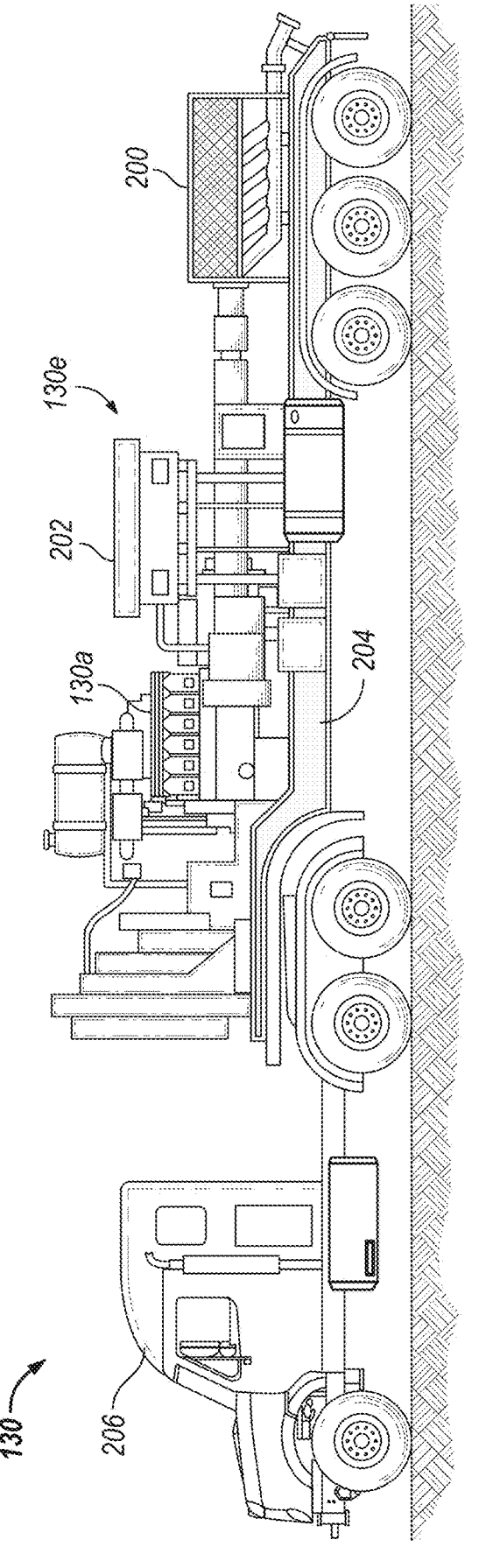
FIG. 2 is a diagram illustrating an example pumping system, according to aspects of the present disclosure.

FIG. 2 illustrates an example pumping system 130, according to aspects of the present disclosure. Pumping system 130 may be used, for instance, as one or more of pumping systems 130 described above with reference to FIG. 1. As depicted, pumping system 130 comprises a first mover 130*a* in the form of a diesel engine coupled to reciprocating positive displacement pump 200 through a transmission system 202 into which an electric pump motor 130*e* is integrated. First mover 130*a*, reciprocating positive displacement pump 200, and transmission system 202 may be at least partially mounted on a trailer 204 coupled to a truck 206. Truck 206 may comprise, for instance, a conventional engine that provides locomotion to truck 206 and trailer 204 through a transmission system 202 incorporating an electric pump motor 130*e*. Transmission system 202 may further comprise an electrical connection, such as a cable, between the transmission of truck 206 and electric pump motor 130*e* in transmission system 202.

In use, truck 206 and trailer 204 with the pumping equipment mounted thereon may be driven to a well site at which a fracturing or other treatment operation will take place. In certain embodiments, truck 206 and trailer 204 may be one of many similar trucks and trailers that are driven to a well site. Once at the site, reciprocating positive displacement pump 200 may be fluidically coupled to a wellbore 150 (e.g., referring to FIG. 1), such as through a fluid manifold 140 (e.g., referring to FIG. 1), to provide treatment fluid to wellbore 150. Reciprocating positive displacement pump 200 may further be fluidically coupled to a source of treatment fluids to be pumped into the wellbore. When connected, the diesel engine may be started to provide a primary source of torque to reciprocating positive displacement pump 200 through the pump transmission system 202. Electric pump motor 130*e* in pump transmission system 202 similar may be engaged to provide a supplemental source of torque to reciprocating positive displacement pump 200. As depicted, electric pump motor 130*e* in pump transmission system 202 may receive energy directly from the transmission of truck 206, such that truck 206 itself operates as an electrical generator for the pumping operation. In addition to energy from truck 206 and electric pump motor 130*e* in pump transmission system 202, reciprocating positive displacement pump 200 may receive electricity from other energy sources on the site, including a dedicated electrical generator on site or other pumping systems located on the site. During frac operations 100, measurements may be performed to determine downhole properties or wellbore 150 and/or the formation. These measurements may be further processed by additional methods and systems that may utilize information handling system 190.

Figure 3:
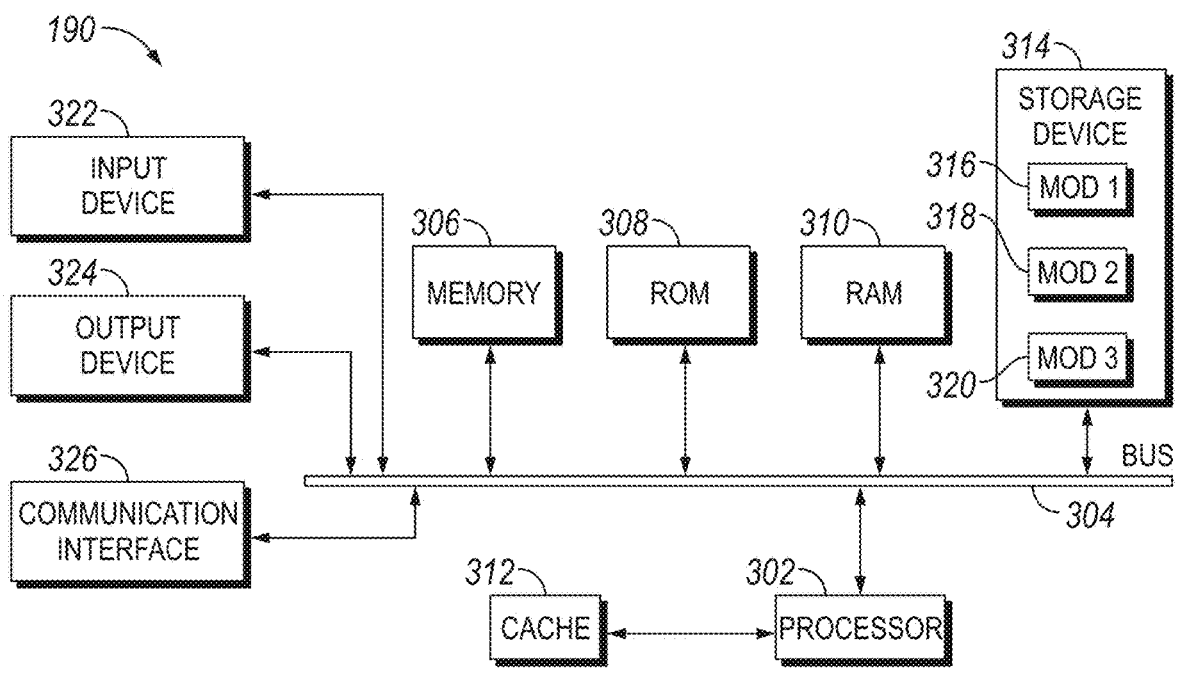
FIG. 3 illustrates a schematic of an information handling system.

FIG. 3 further illustrates an example information handling system 190 which may be employed to perform various steps, methods, and techniques disclosed herein. Persons of ordinary skill in the art will readily appreciate that other system examples are possible. As illustrated, information handling system 190 comprises a processing unit (CPU or processor) 302 and a system bus 304 that couples various system components including system memory 306 such as read only memory (ROM) 308 and random-access memory (RAM) 310 to processor 302. Processors disclosed herein may all be forms of this processor 302. Information handling system 190 may comprise a cache 312 of high-speed memory connected directly with, in close proximity to, or integrated as part of processor 302. Information handling system 190 copies data from memory 306 and/or storage device 314 to cache 312 for quick access by processor 302. In this way, cache 312 provides a performance boost that avoids processor 302 delays while waiting for data. These and other modules may control or be configured to control processor 302 to perform various operations or actions. Other system memory 306 may be available for use as well. Memory 306 may comprise multiple different types of memory with different performance characteristics. It may be appreciated that the disclosure may operate on information handling system 190 with more than one processor 302 or on a group or cluster of computing devices networked together to provide greater processing capability. Processor 302 may comprise any general-purpose processor and a hardware module or software module, such as first module 316, second module 318, and third module 320 stored in storage device 314, configured to control processor 302 as well as a special-purpose processor where software instructions are incorporated into processor 302. Processor 302 may be a self-contained computing system, containing multiple cores or processors, a bus, memory controller, cache, etc. A multi-core processor may be symmetric or asymmetric. Processor 302 may comprise multiple processors, such as a system having multiple, physically separate processors in different sockets, or a system having multiple processor cores on a single physical chip. Similarly, processor 302 may comprise multiple distributed processors located in multiple separate computing devices but working together such as via a communications network. Multiple processors or processor cores may share resources such as memory 306 or cache 312 or may operate using independent resources. Processor 302 may comprise one or more state machines, an application specific integrated circuit (ASIC), or a programmable gate array (PGA) including a field PGA (FPGA).

Each individual component discussed above may be coupled to system bus 304, which may connect each and every individual component to each other. System bus 304 may be any of several types of bus structures including a memory bus or memory controller, a peripheral bus, and a local bus using any of a variety of bus architectures. A basic input/output (BIOS) stored in ROM 308 or the like, may provide the basic routine that helps to transfer information between elements within information handling system 190, such as during start-up. Information handling system 190 further comprises storage devices 314 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 314 may comprise software modules 316, 318, and 320 for controlling processor 302. Information handling system 190 may comprise other hardware or software modules. Storage device 314 is connected to the system bus 304 by a drive interface. The drives and the associated computer-readable storage devices provide non-volatile storage of computer-readable instructions, data structures, program modules and other data for information handling system 190. In one aspect, a hardware module that performs a particular function comprises the software component stored in a tangible computer-readable storage device in connection with hardware components, such as processor 302, system bus 304, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 190 is a small, handheld computing device, a desktop computer, or a computer server. When processor 302 executes instructions to perform "operations", processor 302 may perform the operations directly and/or facilitate, direct, or cooperate with another device or component to perform the operations.

As illustrated, information handling system 190 employs storage device 314, which may be a hard disk or other types of computer-readable storage devices which may store data that are accessible by a computer, such as magnetic cassettes, flash memory cards, digital versatile disks (DVDs), cartridges, random access memories (RAMs) 310, read only memory (ROM) 308, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 190, an input device 322 represents any number of input mechanisms, such as a microphone for speech, a touch-sensitive screen for gesture or graphical input, keyboard, mouse, motion input, speech and so forth. An output device 324 may also be one or more of a number of output mechanisms known to those of skill in the art. In some instances, multimodal systems enable a user to provide multiple types of input to communicate with information handling system 190. Communications interface 326 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 302, that is purpose-built to operate as an equivalent to software executing on a general-purpose processor. For example, the functions of one or more processors presented in FIG. 3 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) 308 for storing software performing the operations described below, and random-access memory (RAM) 310 for storing results. Very large-scale integration (VLSI) hardware embodiments, as well as custom VLSI circuitry in combination with a general-purpose DSP circuit, may also be provided.

Figure 4:
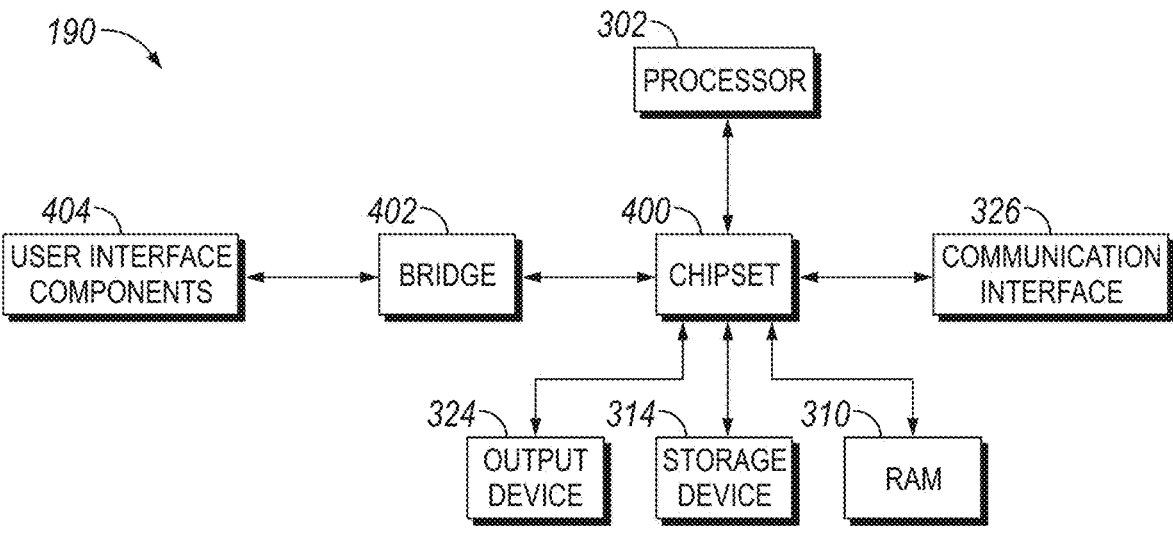
FIG. 4 illustrates a schematic of a chip set.

FIG. 4 illustrates an example information handling system 190 having a chipset architecture that may be used in executing the described method and generating and displaying a graphical user interface (GUI). Information handling system 190 is an example of computer hardware, software, and firmware that may be used to implement the disclosed technology. Information handling system 190 may comprise a processor 302, representative of any number of physically and/or logically distinct resources capable of executing software, firmware, and hardware configured to perform identified computations. Processor 302 may communicate with a chipset 400 that may control input to and output from processor 302. In this example, chipset 400 outputs information to output device 324, such as a display, and may read and write information to storage device 314, which may comprise, for example, magnetic media, and solid-state media. Chipset 400 may also read data from and write data to RAM 310. A bridge 402 for interfacing with a variety of user interface components 404 may be provided for interfacing with chipset 400. Such user interface components 404 may comprise a keyboard, a microphone, touch detection and processing circuitry, a pointing device, such as a mouse, and so on. In general, inputs to information handling system 190 may come from any of a variety of sources, machine generated and/or human generated.

Chipset 400 may also interface with one or more communication interfaces 326 that may have different physical interfaces. Such communication interfaces may comprise interfaces for wired and wireless local area networks, for broadband wireless networks, as well as personal area networks. Some applications of the methods for generating, displaying, and using the GUI disclosed herein may comprise receiving ordered datasets over the physical interface or be generated by the machine itself by processor 302 analyzing data stored in storage device 314 or RAM 310. Further, information handling system 190 receives inputs from a user via user interface components 404 and executes appropriate functions, such as browsing functions by interpreting these inputs using processor 302.

In examples, information handling system 190 may also comprise tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may comprise RAM, ROM, EEPROM, CD-ROM or other optical disk storage, magnetic disk storage or other magnetic storage devices, or any other device which may be used to carry or store program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be comprised within the scope of the computer-readable storage devices.

Computer-executable instructions comprise, for example, instructions and data which cause a general-purpose computer, special purpose computer, or special purpose processing device to perform a certain function or group of functions. Computer-executable instructions also comprise program modules that are executed by computers in stand-alone or network environments. Generally, program modules comprise routines, programs, components, data structures, objects, and the functions inherent in the design of special-purpose processors, etc. that perform particular tasks or implement particular abstract data types. Computer-executable instructions, associated data structures, and program modules represent examples of the program code for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 5:
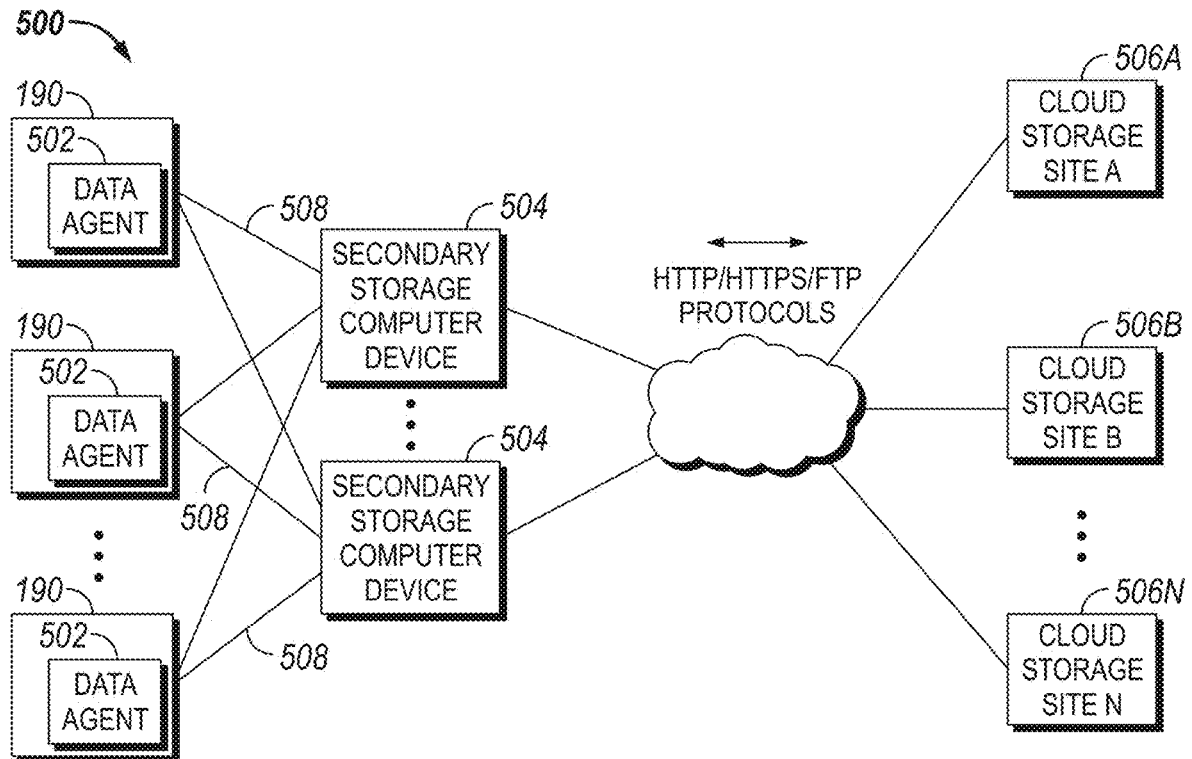
FIG. 5 illustrates a computing network.

FIG. 5 illustrates an example of one arrangement of resources in a computing network 500 that may employ the processes and techniques described herein, although many others are of course possible. As noted above, an information handling system 190, as part of their function, may utilize data, which comprises files, directories, metadata (e.g., access control list (ACLS) creation/edit dates associated with the data, etc.), and other data objects. The data on the information handling system 190 is typically a primary copy (e.g., a production copy). During a copy, backup, archive or other storage operation, information handling system 190 may send a copy of some data objects (or some components thereof) to a secondary storage computing device 504 by utilizing one or more data agents 502.

A data agent 502 may be a desktop application, website application, or any software-based application that is run on information handling system 190. As illustrated, information handling system 190 may be disposed at any rig site (e.g., referring to FIG. 1), off site location, or repair and manufacturing center. The data agent may communicate with a secondary storage computing device 504 using communication protocol 508 in a wired or wireless system. Communication protocol 508 may function and operate as an input to a website application. In the website application, field data related to pre- and post-operations, generated DTCs, notes, and the like may be uploaded. Additionally, information handling system 190 may utilize communication protocol 508 to access processed measurements, operations with similar DTCs, troubleshooting findings, historical run data, and/or the like. This information is accessed from secondary storage computing device 504 by data agent 502, which is loaded on information handling system 190.

Secondary storage computing device 504 may operate and function to create secondary copies of primary data objects (or some components thereof) in various cloud storage sites 506A-N. Additionally, secondary storage computing device 504 may run determinative algorithms on data uploaded from one or more information handling systems 190, discussed further below. Communications between the secondary storage computing devices 504 and cloud storage sites 506A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 506A-N, the secondary storage computing device 504 may also perform local content indexing and/or local object-level, sub-object-level or block-level deduplication when performing storage operations involving various cloud storage sites 506A-N. Cloud storage sites 506A-N may further record and maintain, EM logs, map DTC codes, store repair and maintenance data, store operational data, and/or provide outputs from determinative algorithms that are located in cloud storage sites 506A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principles and define the mathematical relationship of a system, a pure machine learning model may not be derived from first principles. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may comprise evaluating model performance according to whether the model is over-fit or under-fit. As it may be assumed that all datasets contain some level of error, it may be important to evaluate and optimize the model performance and associated model fit by a model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods comprise k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may comprise the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may comprise whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset comprises both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may comprise Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not comprise a dependent variable as the intended function of this type of algorithm is to identify one or more groupings or clusters within a dataset. In a non-limiting example, algorithms which may be utilized for unsupervised machine learning may comprise K-means clustering, K-means classification, Fuzzy C-Means, Gaussian Mixture, Hidden Markov Model, Neural Networks, and Hierarchical algorithms.

Figure 6:
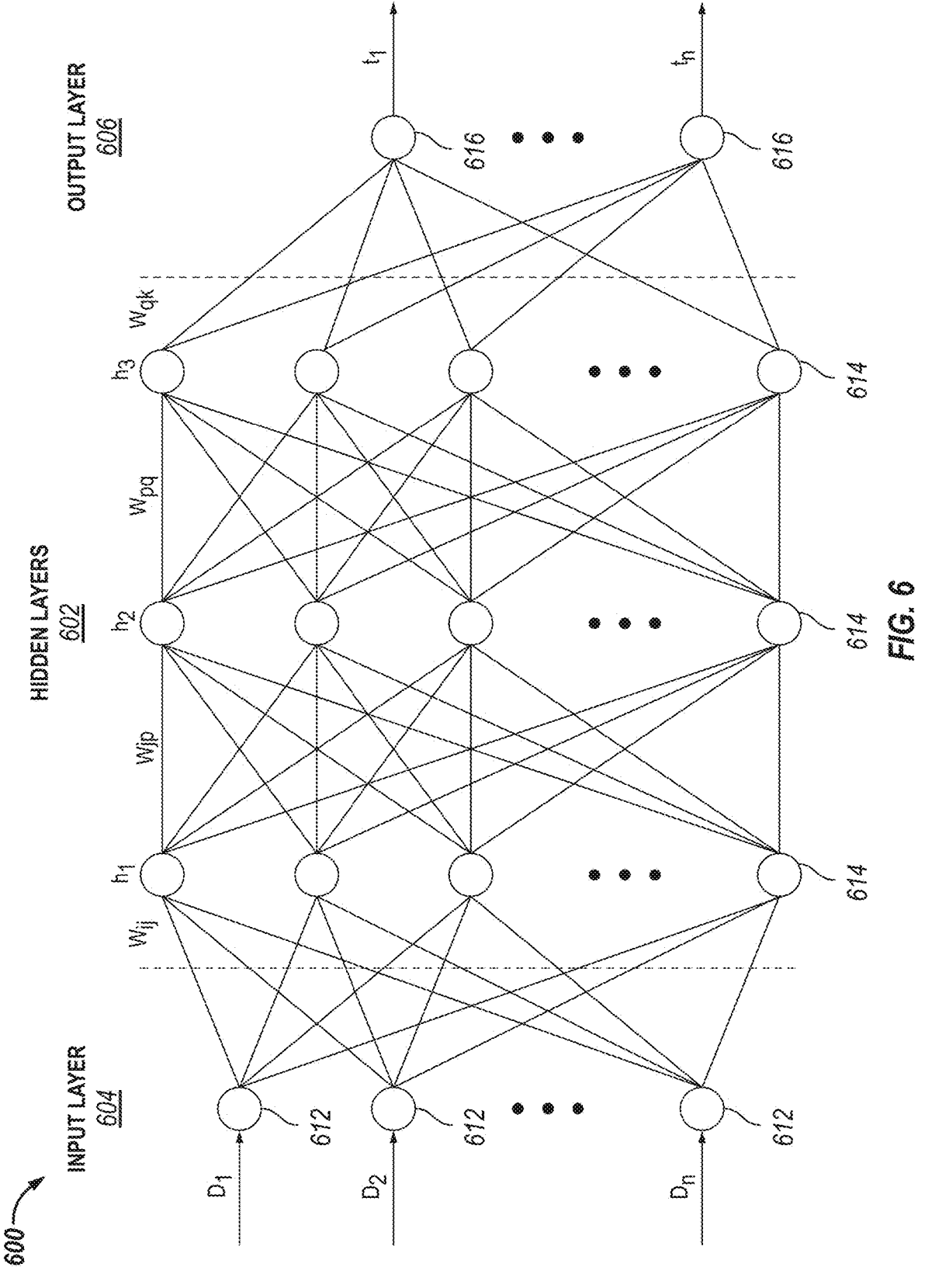
FIG. 6 illustrates a neural network.

In examples to determine a relationship using machine learning, a neural network (NN) 600, as illustrated in FIG. 6, may be utilized to establishing a relationship between the rate at which the wellhead pressure measurement rises and falls during subsequent reflection cycles and the pipe friction factor and stage resistance. FIG. 6 illustrates neural network (NN) 600. NN 600 may operate utilizing one or more information handling systems 190 (e.g., referring to FIG. 1) on computing network 500. Although a NN is illustrated, multiple models may be used with input output structures. These models may comprise flexible empirical models such as NN, gaussian processing methods, kriging methods, evolutionary methods such as genetic algorithms, classification methods, clustering methods empirical methods, or physics-based methods such as equations of state, thermodynamic models, geological, geochemistry, or chemistry models, or kinetic models or any combinations therein including recursive combinations of similar or dissimilar models and iterative model combinations. A NN 600 is an artificial neural network with one or more hidden layers 602 between input layer 604 and output layer 606. In examples, NN 600 may be software on a single information handling system 190. In other examples, NN 600 may software running on multiple information handling systems 190 connected wirelessly and/or by a hard-wired connection in a network of multiple information handling systems 190. Herein, NN 600 may be applied in a wide array of implementations.

During operations, input data is given to neurons 612 in input layer 604. Neurons 612, 614, and 616 are defined as individual or multiple information handling systems 190 connected in a computing network 500. The output from neurons 612 may be transferred to one or more neurons 614 within one or more hidden layers 602. Hidden layers 602 comprises one or more neurons 614 connected in a network that further process information from neurons 612. The number of hidden layers 602 and neurons 612 in hidden layer 602 may be determined by personnel that design NN 600. Hidden layers 602 is defined as a set of information handling systems 190 assigned to specific processing. Hidden layers 602 spread computation to multiple neurons 612, which may allow for faster computing, processing, training, and learning by NN 600. Output from NN 600 may be computed by neurons 616. An information handling system 190 (e.g., referring to FIG. 1) being utilized in a computing network 500, NN 600, or alone may control frac operations 100. Specifically, measurements from electric pump motor 130e of parameters of electric pump motor 130e being used for a frac operation 100 may be measured and sent to information handling system 190 for further analysis. As discussed below, a tube wave, which may be generated and measured in any number of ways. Measurements of the tube wave may allow for analysis of subsurface properties.

In examples, a tube wave may be created by energetic surface equipment such as an air or plasma gun. In general, these devices release energy very rapidly in line with the wellbore fluid in wellbore 150, thereby generating a short-time pulse of increased pressure. This tube wave may then propagate downhole within wellbore 150 and may generate the desired acoustic reflections. Another excitation method that does not utilize such additional surface equipment, but rather utilizes the standard operation of surface equipment used during fracturing stage (e.g., pumps, valves, gear shifts, etc.) Other methods may comprise changing the flow rate in wellbore 150. Flow rate change may be created by ramping down electric pump motors 130e. In other examples, the tube wave may also be generated by changing the flow rate of at least one pump, neutralizing all the pumps, or opening or closing at least one of the surface valves. Generally, at the end of a frac operation, a tube wave may be generated. The tube wave may be measured by at least one pressure transducer at surface that may be in fluid communication with wellbore 150.

Figures 7A, 7B:
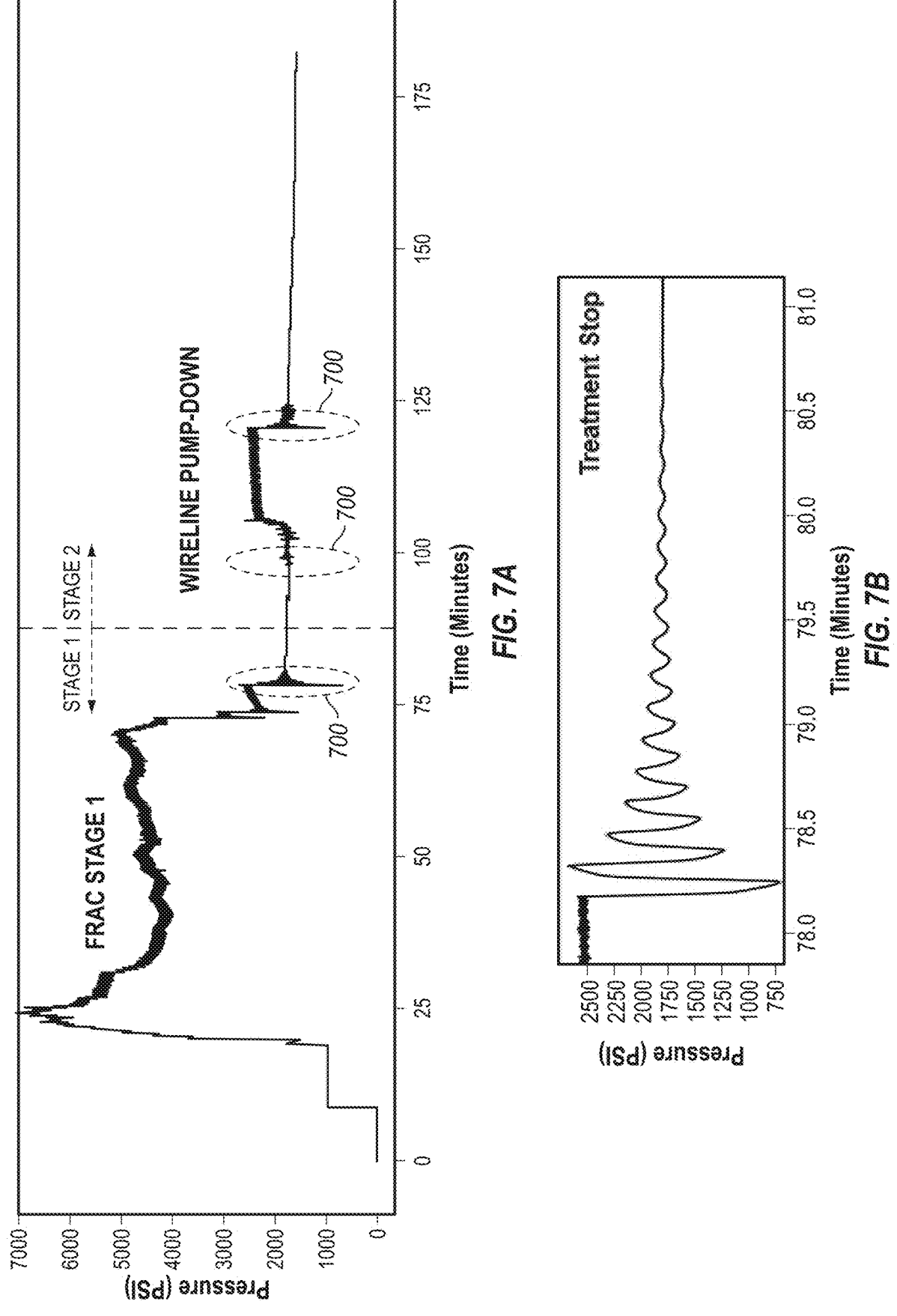
FIGS. 7A-7D are a series of graphs illustrating a time history of pressure measurements taken at different stages.
Figure 7C:
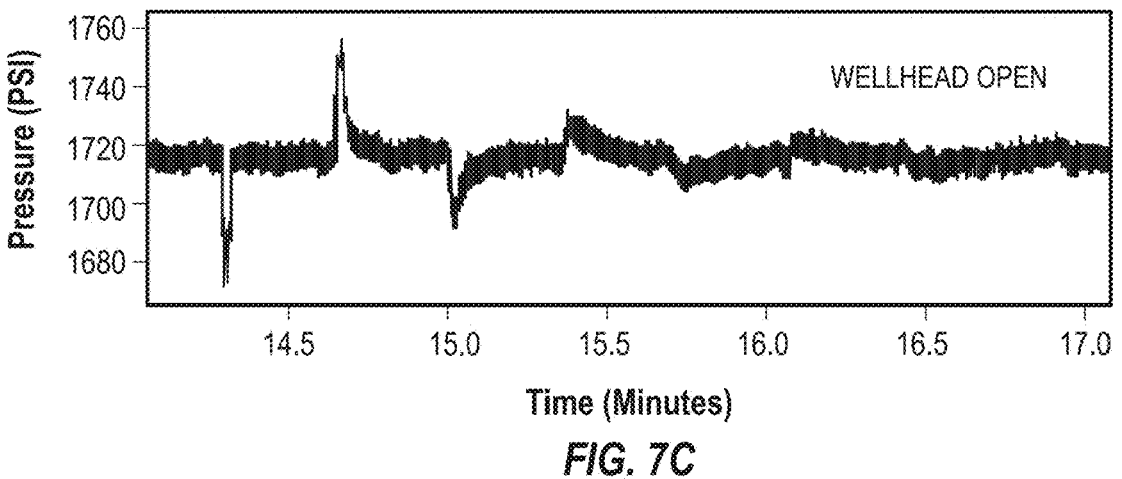
Figure 7D:
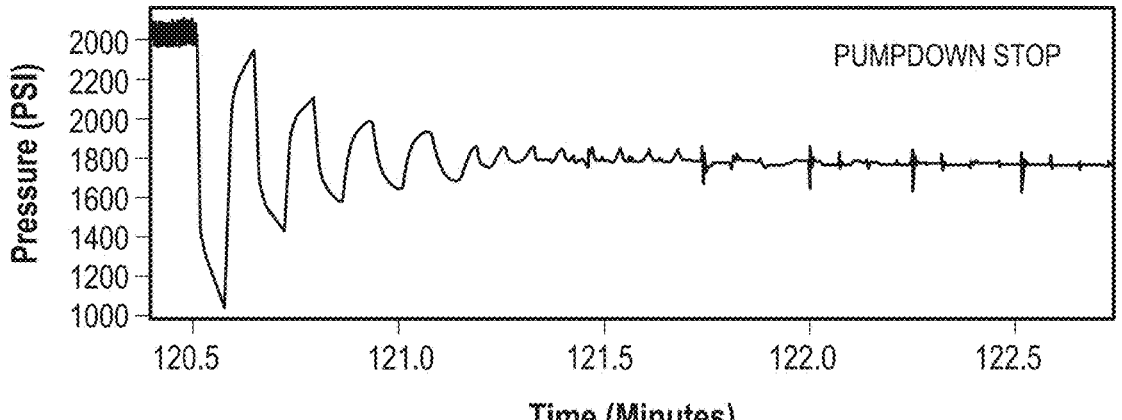

FIGS. 7A-7D are a series of graphs illustrating a time history of pressure measurements taken at different stages. For frac operation 100 (e.g., referring to FIG. 1) there may be a number of stages or process that take place. For example, in the plug and perf process, the stage is defined by where the current plug is set to surface. From the surface, the "stage" comprises of thousands of feet of wellbore pipe, hundred or so feet of perforations, and the plug. Highlighted in FIG. 7A are three standard operational events 700 that excite a tube wave at surface. In FIG. 7B, the tube wave generated in a ramp down of electric pump motor 130e at the end of the main treatment is shown. In FIG. 7C, the tube wave generated by a pressure equalization between wellbore 150 and treatment line as the valve is opened in preparation for wireline operations is shown. Finally, in FIG. 7D, the tube wave generated at the end of the wireline pump down is shown. Though each of these excitation methods have different fundamental wave forms, they all generate pressure disturbances that may be used to determine subsurface properties. As noted above, another potential excitation method of the pressure disturbance that forms a tube wave may originate from frac operations 100 (e.g., referring to FIG. 1). That is, as electric pump motors 130e (e.g., referring to FIG. 1) come on/offline there is a step in flow rate that, in turn, generates a step in pressure (i.e., up if electric pump motors 130e come online and down if electric pump motors 130e go offline). Similarly, if one or more electric pump motors 130e simultaneously increase their output revolutions per minute (RPM), there may be a change in flow rate that generates a change in pressure at the surface. In both cases there is the potential to measure subsurface reflections from the resulting tube wave.

With continued reference to FIGS. 7A-7D, a time series of measured pressure during a fracture treatment with an embedded tube wave signatures that were excited by some operational process, as described above, for example a rapid ramp down of pumping rate. The fundamental challenge contemplated here is to extract from the tube wave signature the Darcy friction factor for pipe within wellbore 150, and an aggregate resistance imposed by the toe-end of the stage. The extracted friction factor and stage resistance, in turn, provide subsurface properties.

Figure 8:
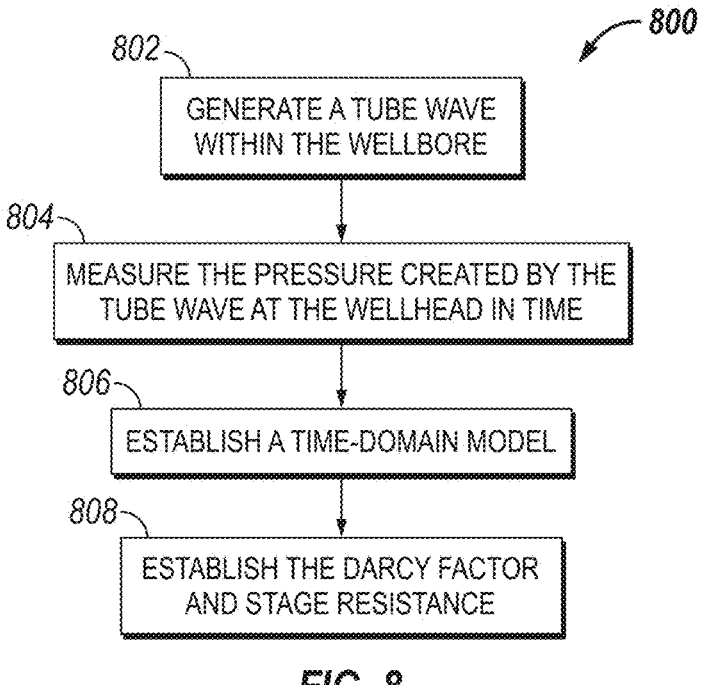
FIG. 8 is a workflow for establishing a relationship between the rate at which the wellhead pressure measurement rises and falls during subsequent reflection cycles and the pipe friction factor and stage resistance.

FIG. 8 is a workflow 800 for establishing a relationship between the rate at which the wellhead pressure measurement rises and falls during subsequent reflection cycles and the pipe friction factor and/or stage resistance. As pipe friction (i.e., Darcy factor) and stage resistance are encoded into the pressure transient that is measured at wellhead, the relationship found from workflow 800 may allow for identifying pipe friction and stage resistance. It should be noted that at least a part of workflow 800 may be performed on information handling system 190. The methods and systems described below utilize detailed and specific knowledge about the way in which the friction factor and resistance may be encoded into the tube wave over multiple reflections to uniquely and robustly extract them. As disclosed herein, encoded is defined as a way in which, and to what degree, the pressure measurement may be influenced and changes with changing pipe friction and stage resistance. A model and its approximate analytical solution may be used to infer the relationship between the rate at which the wellhead pressure measurement rises and falls during subsequent reflection cycles and the pipe friction factor and stage resistance. The methods and systems may be simple and quantitatively efficient. Additionally, the systems and methods separate themselves from current technology in that existing methods rely only on the first reflection, which may introduce inaccuracies and instabilities due to the presence of signal noise. The proposed method, described below, utilizes multiple reflections to improve the stability of the solutions found below. For example, additional measurements may provide the following. First, in a statistical sense it improves the accuracy of the inversion from pressure measurement to pipe friction. Second, it constrains the inversion process and therefore the solution may be less sensitive (and therefore more stable) to small changes in system noise and other errors.

Workflow 800 may begin with block 802. In block 802, a tube wave within wellbore 150 is generated using methods and systems described above in FIGS. 7A-7D. During measurement operations, which generally may happen at the end of a frac operation, a tube wave may be induced into wellbore 150. In block 804, at wellhead a measurement of the pressure of the tube wave generated in time may be taken. In examples, the measurements may be performed by pressure transducers (not illustrated) that may be placed at, or near, the wellhead. The measured signals are digitized and processed. In block 806, the measurements from block 804 may be utilized to from a time-domain model. In examples, the time may be formed by parameters associated with measurements taken from block 804. During the inversion process these parameters are changed until the time-domain model matches the physical measurement. At a state of "best fit" the model has been built. The time-domain model may be applied to establish that the slope of the measured pressure behaves approximately as follows:

$$m_n(t) = \Delta \frac{\alpha}{2}\left(\frac{R-1}{R+1}\right)^{n-1} \tag{1}$$

for $$(n-1)\frac{2L}{V_w} \leq t < n\frac{2L}{V_w}, \quad n = 1, 2, \ldots, \tag{2}$$

Figure 9:
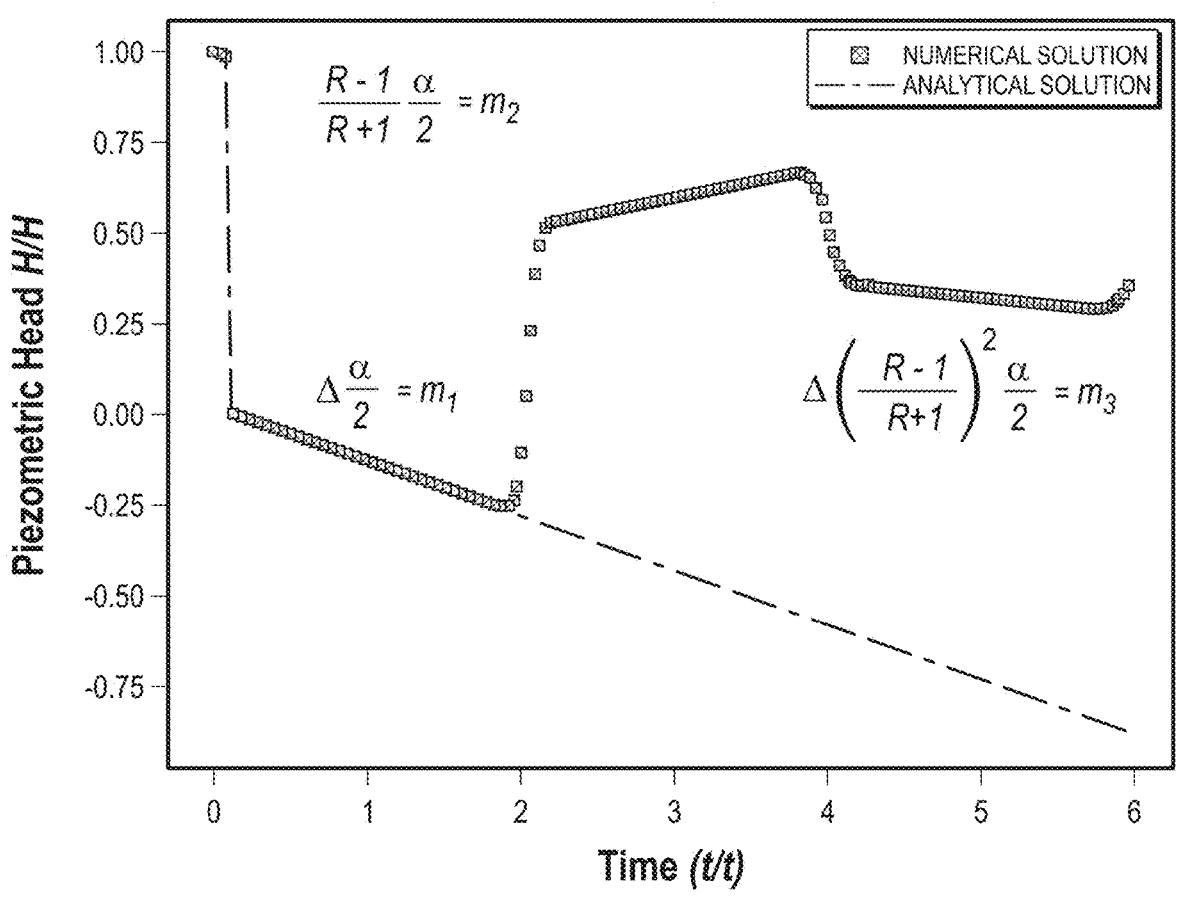
FIG. 9 is a graph illustrating an example tube wave measurement with a full drop of the rate of electric pump motor so that $\Delta=-1$.

In block 808, the established time-domain model from block 806 may be utilized to establish the darcy factor and stage resistance. For example, in block 808, it may be assumed that where $\Delta < 0$ is the fractional pumping rate dropped, $\alpha$ is the scaled Darcy friction factor listed in in Equations (42)-(46), seen below. Within the equations, where the $\alpha$ is a pipe friction, f is a friction factor, L is the length of one or more tubulars in the wellbore, $Q_o$ is a flow rate in units of $m^{3/s}$, $V_w$ is the speed of the tube wave in the tubular, D is a diameter of the tubular, A is an a cross sectional area of the tubular, R is the stage resistance, R is a resistance in the tubular, and $\rho_0$ is a fluid density in units of $kg/m^3$. It should be noted that "stage resistance" is the aggregate resistance of the perforations at the end of the stage in the wellbore. One resistance may be utilized because the acoustic crossing time of the perforations is very small. Very small is defined for this disclosure as acoustic wave speeds in the wellbore that may travel at about 1500 m/s while the typical depth-wise length of perforation intervals is about 100 m so that the wave crosses this interval in roughly 0.1 seconds. Once stage n frac treatment is finished, a new set of perforations may be generated, a new plug is set closer to surface, and this defines the (n+1) stage. FIG. 9 is a graph illustrating an example tube wave measurement with a full drop of the rate in a step-like rate drop of pumps so that $\Delta = -1$. The nondimensional friction factor and resistance defined in Equations (42)-(46), seen below, may be chosen to be $\alpha = 0.5$ and R=0.3, respectively, where $\alpha$ is pipe friction. Note that Equations (1) & (2), may describe the measured pressure gradient in time during the $n^{th}$ out-and-back cycle of the tube wave. Taking the ratio of any two adjacent cycles gives a simple relationship for the stage resistance simply the reflection coefficient:

$$\frac{R-1}{R+1} = \frac{m_{n+1}}{m_n} \tag{3}$$

for all n. This may be solved for the resistance R as follows:

$$R = \frac{1 - m_{n+1}/m_n}{1 + m_{n+1}/m_n} \tag{4}$$

The pipe friction may be solved for using the first cycle, prior to any reflection as mathematically indicated by:

$$\alpha = \frac{2m_1}{\Delta} \tag{5}$$

Figure 10:
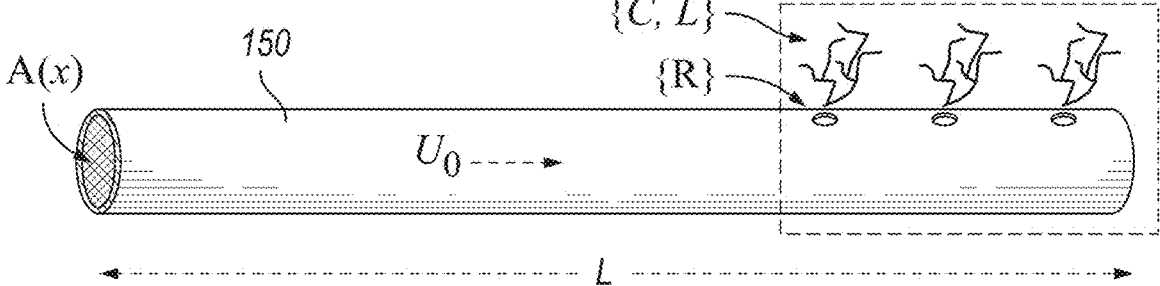
FIG. 10 illustrates the $n^{th}$ stage of a fracturing operation.

The measurements taken during the measurement operation, described above, may be further analyses in the time-domain. To analyze the measurements in the time-domain the different stages of fracture operations may be considered. FIG. 10 illustrates the $n^{th}$ stage of a fracturing operation. The stage under consideration has a plug set at measured depth x=L. Wellbore 150 has a cross-sectional area A(x) that may depend on the depth, and there may be flow $U_0$ down wellbore 150, through the perforations and into the fractures as shown in the figure. Depiction of the $n^{th}$ stage of length L in wellbore 150 with cross sectional area A(x) that is dependent on measured length x, with flow rate $U_0$. The plug, perforations and fractures are shown at the end of the stage and is enclosed in dashed box with impedance characterized by resistance R, capacitance C and Inductance I. The fractured stage is enclosed within the dashed box in FIG. 10, and typically has a much shorter length than the measured depth at which the plug is set. For example, Lis thousands to tens of thousands of feet while a stage length is hundreds of feet. Tube waves create pressure disturbances at the surface, which may propagate down wellbore 150 and eventually reach the stage wherein the pressure waves may be partially reflected and transmitted. A transient acoustic model in the dependent variables of pressure is mathematically depicted as $$P \to P(x, t) \tag{6}$$

and velocity $$U \to U(x, t) \tag{7}$$

may be written as $$\frac{\partial}{\partial t}P + \frac{1}{a(x)}\left[U_0\frac{\partial}{\partial x}(a(x)P) + \rho_0 c^2\frac{\partial}{\partial x}(a(x)U)\right] = 0 \tag{8}$$

$$\frac{\partial}{\partial t}U + \frac{1}{a(x)}\left[\rho_0^{-1}\frac{\partial}{\partial x}(a(x)P) + U_0\frac{\partial}{\partial x}(a(x)U)\right] = -g\sin(\theta) - \tag{9}$$

$$J_s(U) - J_U(U)$$

where Equation (8) is the conservation of mass, and Equation (9) is the conservation of momentum. The pressure excitation can be represented by the initial conditions expressed as:

$$P(x, t=0) = U(x, t=0) = \phi(x) \tag{10}$$

in which the initial pressure and velocity are set equal so that there is only a downward-propagating component of the excitation. The forward model is completed with the following boundary conditions, $$U(0, t) = 0 \tag{11}$$

$$\frac{1}{a(x)}\frac{\partial}{\partial t}P(L, t) = R\frac{\partial}{\partial t}U(L, t) + \frac{1}{c}U(L, t) + L\frac{\partial^2}{\partial t^2}U(L, t) \tag{12}$$

The boundary condition at the end of the stage x=L may be characterized by the parameters [R, I, C], which may be analogous to the electrical resistance, inductance and capacitance, respectively within an electrical circuit. These parameters capture characteristics of the reflected and transmitted waves at the stage end.

For the methods described below, it may be assumed that the convective acceleration terms may be ignored, the cross-sectional area of wellbore 150 is constant, and a linearized pipe friction. Using these assumptions, Equations (8)-(12) may be reduced in complexity to the following:

$$P_{,T} + \rho_0 V_w^2 U_{,X} = 0 \tag{13}$$

$$U_{,T} + \frac{1}{\rho_0}P_{,X} = -\frac{f}{2D}U_0|U| - g\sin(\theta) \tag{14}$$

with initial conditions $$P(X, T=0) = f(X) \tag{15}$$

$$U(X, T=0) = g(X) \tag{16}$$

and boundary conditions $$P_{,X}(X=0, T) = 0 \tag{17}$$

$$\frac{1}{A}P(L, T) = RU(L, T) + \frac{1}{C}\int U(L, T)dT + I\frac{dU}{dT}(L, T) \tag{18}$$

Making a transformation to the independent variables. The Equations above may be expressed further as:

$$H(X, T) = \frac{P(X, T)}{\rho_0 \hat{g}} + X \tag{19}$$

$$Q(X, T) = AU(X, T) \tag{20}$$

where $\hat{g} = g\sin(\theta)$. The model Equations (13)-18) may become:

$$H_{,T} + \frac{V_w^2}{A\hat{g}}Q_{,X}\ 0 \tag{21}$$

$$Q_{,T} + A\hat{g}H_{,X} = -\frac{fQ_0}{2DA}|Q| = 0 \tag{22}$$

with initial conditions $$H(X, T=0) = \frac{f(x)}{\rho_0\hat{g}} \tag{23}$$

$$Q(X, T=0) = Ag(X) \tag{24}$$

And boundary conditions expressed as:

$$H_X(0, T) = 1 \tag{25}$$

$$\rho_0\hat{g}H(L, T) = L\rho_0\hat{g} + RQ(L, T) + \frac{1}{C}\int Q(L, T)dT + I\frac{dQ}{dT}(L, T) \tag{26}$$

Further the independent variables may be scared. Scaling the independent variables as follows:

$$x = X/L \tag{27}$$

$$t = T/\tau \tag{28}$$

and the dependent variables as $$h = H/H^* \tag{29}$$

$$q = Q/Q^* \tag{30}$$

This allow for the equation to be written as:

$$h_{,t} + q_{,x} = 0 \tag{31}$$

$$q_{,t} + h_{,x} = -\alpha|q| \tag{32}$$

with initial conditions expressed as:

$$h(x, 0) \equiv h_0(x) = f(Lx)/P^* + \lambda x \tag{33}$$

$$q(x, 0) \equiv q_0(x) = g(Lx)/U^* \tag{34}$$

and boundary conditions expressed as:

$$h_x(0, t) = \lambda \tag{35}$$

$$h(1, t) = \lambda + Rq(1, t) + \frac{1}{C}\int q(1, t)dt + J\frac{dq}{dt}(1, t) \tag{36}$$

where the scales are $$\tau = \frac{L}{V_w} \tag{37}$$

$$P^* = \rho_0 V_w^2 \tag{38}$$

$$H^* = \frac{V_w^2}{\hat{q}} \tag{39}$$

$$U^* = V_w \tag{40}$$

$$Q^* = AV_w \tag{41}$$

and the non-dimensional parameters may be:

$$\alpha = \frac{fLQ_0}{2V_w DA} \tag{42}$$

$$\lambda = \frac{L\hat{g}}{V_w^2} \tag{43}$$

$$R = \frac{RA}{\rho_0 V_w} \tag{44}$$

$$C = \frac{C\rho_0 V_w^2}{LA} \tag{45}$$

$$J = \frac{IA}{\rho_0 V_w} \tag{46}$$

The methods above may be further analyzed in the time-domain by assuming that the stage may be infinitely long, where L=∞. The scaled time-domain model may be written as:

$$h_{,t} + q_{,x} = 0 \tag{47}$$

$$q_{,t} + h_{,x} = -\alpha q \tag{48}$$

with initial conditions:

$$h(x, t = 0) = h_0 - aq_0 x \tag{49}$$

$$q(x, t = 0) = q_0 \tag{50}$$

where the initial condition on h is the pressure head required to overcome friction. The boundary conditions may be expressed as:

$$q(x, t) \text{ bounded as } x \to \infty \tag{51}$$

$$q(x = 0, t) = q_0 + \Delta \mathcal{H}(t - t_0) \tag{52}$$

where $h_0$ and $q_0$ are the stationary pressure and pumping rates, H(t) is the Heaviside step function, and $\Delta$<0 is the fractional rate drop at t=t0.

An approximate time-domain solution to this system may be derived and the result may be expressed as:

$$h(x, t) \approx \Delta e^{-\frac{a}{2}x}\left[\frac{a}{2}(t - t_0 - x) + 1\right]H(t - t_0 - x) + h_0 - aq_0 x \tag{53}$$

$$q(x, t) \approx \Delta e^{-\frac{a}{2}x}\mathcal{H}(t - t_0 - x) + q_0 \tag{54}$$

Figure 11A:
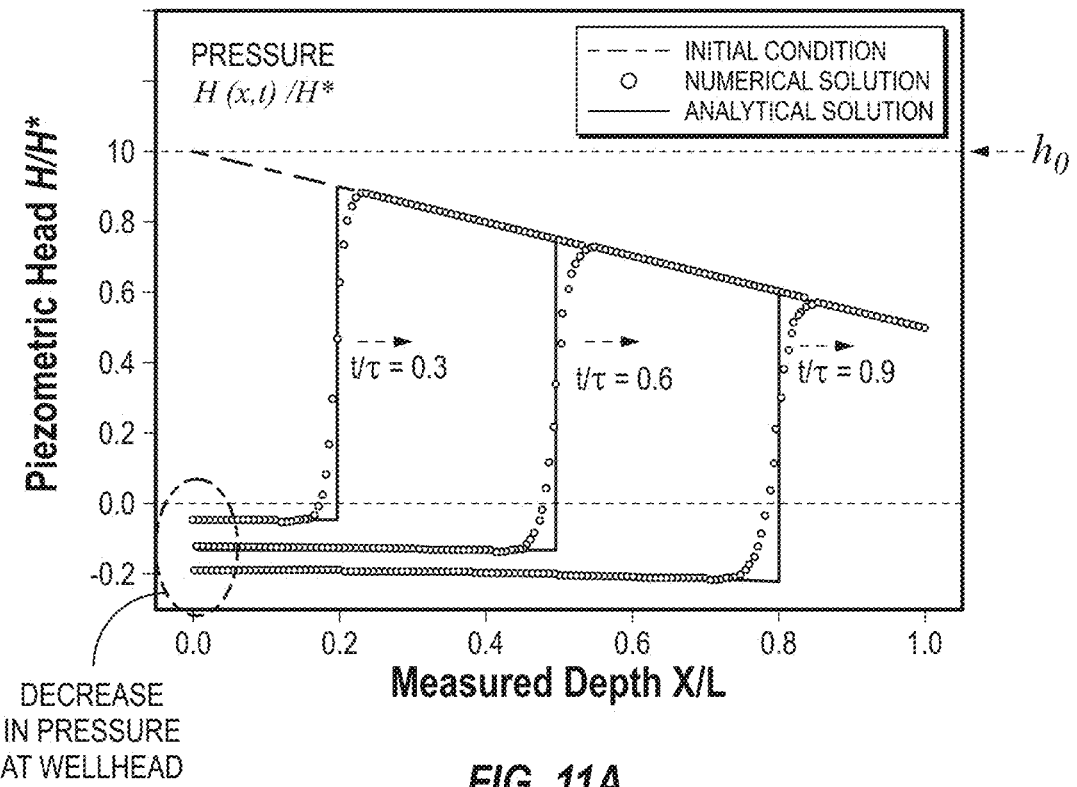
FIGS. 11A & 11B are graphs of full a full numerical solution of pressure that may be created by a tube wave.
Figure 11B:
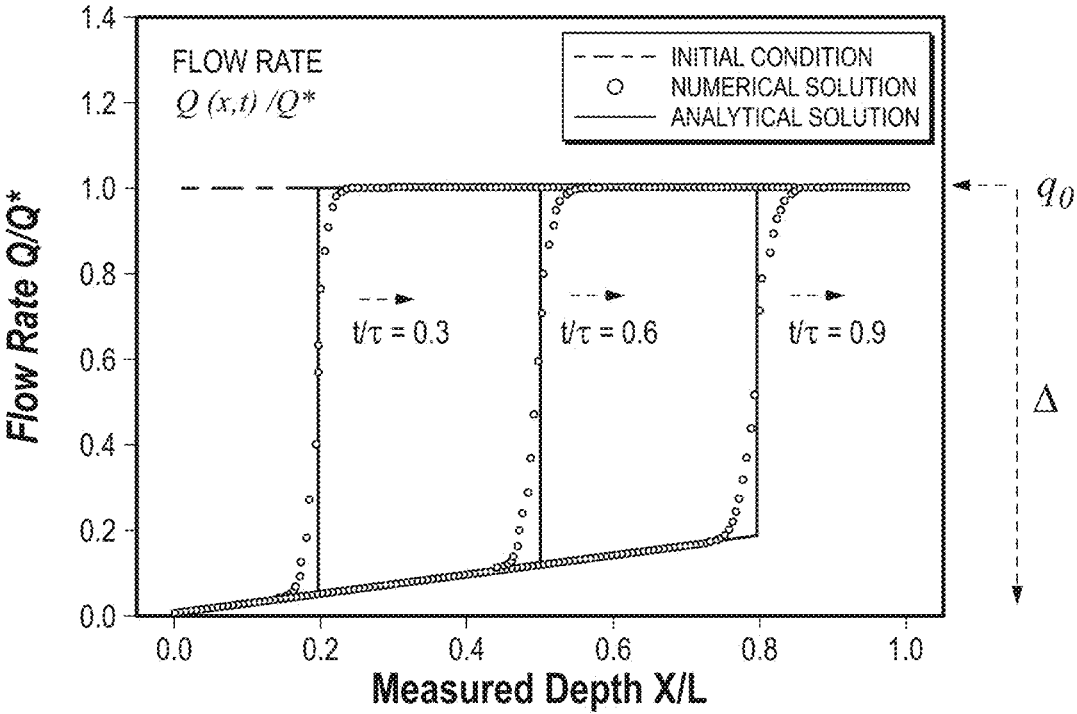

The approximate solutions in Equations (53) & (54) may be compared to a full numerical solution in FIGS. 11A and 11B. The approximation, shown as solid curves, captures the full solution of the equations disclosed above. Thus, the approximation matches the full solution closely. As shown in FIG. 11A, the approximation captures the rate at which pressure drops at the wellhead. The solution is also shown to capture the slope of the flow rate increase down wellbore 150 (e.g., referring to FIG. 1) in FIG. 11B. It should be noted that at the wellhead x=0 and the pressure has the simplified form time series, expressed as:

$$p_{wellhead(t)} = \Delta\frac{\alpha}{2}(t - t_0)\mathcal{H}(t - t_0) + h_0 \tag{55}$$

Therefore, for t>t0 the pressure drops at a rate $\Delta\alpha/2$. The rate of pressure drop is proportional to the amplitude of the wave, namely $\Delta$. Therefore, upon first reflection of the tube wave from the end of the stage, the rate drop may be approximated by:

$$\Delta\frac{\alpha}{2}\frac{R-1}{R+1} \tag{56}$$

where the reflection coefficient shows up due to the reflection of the tube wave at the bottom of the stage. This method may be extended to later cycles with the reflection coefficient showing up in higher powers and giving the slope of Equations (1) and (2). This information may be utilized in designs of later stages of frac operations and/or used to alter treatment parameters such as proppant concentration, pumping rate, and completions design. The methods and systems disclosed above may improve results of subsurface parameters. As noted above, the methods and systems described are simple and quantitatively efficient. Existing methods rely only on the amplitude of first reflection, which can introduce inaccuracies and instabilities due to the presence of signal noise. Application of this method over multiple reflection cycles of the tube wave enables multiple measurements of the stage resistance and therefore reducing errors induced by only utilizing the first cycle.

Although the present disclosure and its advantages have been described in detail, it should be understood that various changes, substitutions and alterations may be made herein without departing from the spirit and scope of the disclosure as defined by the appended claims.

Statement 1: A method may comprise generating a tube wave in a tubular of a wellbore, measuring a pressure created by the tube wave at a wellhead, creating a time-domain model based at least in part on the pressure, and identifying a Darcy factor and a stage resistance based at least in part on the time-domain model.

Statement 2: The method of statement 1, further comprising altering frac operations based at least in part on the Darcy factor of the stage resistance.

Statement 3: The method of any preceding statements 1 or 2, further comprising altering treatment parameters such as proppant concentration, pumping rate, or completions design, based at least in part on the Darcy factor or the stage resistance.

Statement 4: The method of any preceding statements 1-3, wherein the pressure is measured by one or more transducers disposed on a wellhead of the wellbore.

Statement 5: The method of any preceding statements 1-4, further comprising inverting the pressure.

Statement 6: The method of any preceding statements 1-5, wherein the time-domain model is a best fit model.

Statement 7: The method of any preceding statements 1-6, wherein the Darcy factor is found using $$\alpha = \frac{fLQ_0}{2V_w DA},$$

where the $\alpha$ is a pipe friction, f is a friction factor, L is a length of one or more tubulars in the wellbore, $Q_o$ is a flow rate, $V_w$ is a speed of the tube wave in the tubular, D is a diameter of the tubular, and A is an a cross sectional area of the tubular.

Statement 8: The method of any preceding statements 1-7, wherein the stage resistance is found using $$R = \frac{RA}{\rho_0 V_w},$$

where K is the stage resistance, R is a resistance in the tubular, A is a cross sectional area of the tubular, $\rho_0$ is a fluid density, and $V_w$ is a speed of the tube wave in the tubular.

Statement 9: The method of any preceding statements 1-8, wherein the stage resistance is an aggregate resistance of one or more perforations in the wellbore.

Statement 10: A non-transitory machine-readable medium having data stored therein representing a software executable by a computer, the software executable comprising instructions configured to recording from a transducer one or more measurements a pressure created by a tube wave in a tubular of a wellbore at a wellhead, creating a time-domain model based at least in part on the pressure, and identifying a Darcy factor and a stage resistance based at least in part on the time-domain model.

Statement 11: The non-transitory machine-readable medium of statement 10, further comprising altering frac operations based at least in part on the Darcy factor of the stage resistance.

Statement 12: The non-transitory machine-readable medium of any preceding statements 10 or 11, further comprising altering treatment parameters such as proppant concentration, pumping rate, or completions design, based at least in part on the Darcy factor or the stage resistance.

Statement 13: The non-transitory machine-readable medium of any preceding statements 11-12, wherein the transducer is disposed on the wellhead of the wellbore.

Statement 14: The non-transitory machine-readable medium of any preceding statements 11-13, further comprising inverting the pressure.

Statement 15: The non-transitory machine-readable medium of any preceding statements 11-14, wherein the time-domain model is a best fit model.

Statement 16: The non-transitory machine-readable medium of any preceding statements 11-15, wherein the Darcy factor is found using $$\alpha = \frac{fLQ_0}{2V_w DA},$$

where the $\alpha$ is a pipe friction, f is a friction factor, L is a length of one or more tubulars in the wellbore, $Q_o$ is a flow rate, $V_w$ is a speed of the tube wave in the tubular, D is a diameter of the tubular, and A is an a cross sectional area of the tubular.

Statement 17: The non-transitory machine-readable medium of any preceding statements 11-16, wherein the stage resistance is found using $$R = \frac{RA}{\rho_0 V_w},$$

where R is the stage resistance, R is a resistance in a tubular, A is a cross sectional area of the tubular, $\rho_0$ is a fluid density, and $V_w$ is a speed of the tube wave in the tubular.

Statement 18: The non-transitory machine-readable medium of any preceding statements 11-17, wherein the stage resistance is an aggregate resistance of one or more perforations in the wellbore.

Statement 19: A system may comprise a transducer to measure a pressure created by a tube wave at a wellhead and an information handling system connected to the transducer. The information handling system may be configured to create a time-domain model based at least in part on the pressure and identify a Darcy factor and a stage resistance based at least in part on the time-domain model.

Statement 20: The system of statement 19, wherein the information handling system is further configured to alter a frac operation based at least in part on the Darcy factor of the stage resistance.

The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
generating a tube wave in a tubular of a wellbore;
measuring a pressure created by the tube wave at a wellhead;
creating a time-domain model based at least in part on the pressure; and
identifying a Darcy factor, wherein the Darcy factor is found using $$\alpha = \frac{fLQ_0}{2V_wDA},$$

where the $\alpha$ is a pipe friction, f is a friction factor, L is a length of one or more tubulars in the wellbore, $Q_o$ is a flow rate, $V_w$ is a speed of the tube wave in the tubular, D is a diameter of the tubular, and A is an a cross sectional area of the tubular:
and a stage resistance based at least in part on the time-domain model.

2. The method of claim 1, further comprising altering frac operations based at least in part on the Darcy factor of the stage resistance.

3. The method of claim 1, further comprising altering treatment parameters such as proppant concentration, pumping rate, or completions design, based at least in part on the Darcy factor or the stage resistance.

4. The method of claim 1, wherein the pressure is measured by one or more transducers disposed on a wellhead of the wellbore.

5. The method of claim 1, further comprising inverting the pressure.

6. The method of claim 1, wherein the time-domain model is a best fit model.

7. The method of claim 1, wherein the stage resistance is an aggregate resistance of one or more perforations in the wellbore.

8. A non-transitory machine-readable medium having data stored therein representing a software executable by a computer, the software executable comprising instructions configured to:
recording from a transducer one or more measurements a pressure created by a tube wave in a tubular of a wellbore at a wellhead;
creating a time-domain model based at least in part on the pressure; and
identifying a Darcy factor and a stage resistance based at least in part on the time-domain model, wherein the stage resistance is found using $$R = \frac{RA}{\rho_0 V_w},$$

where R is the stage resistance, R is a resistance in a tubular, A is a cross sectional area of the tubular, $\rho_0$ is a fluid density, and $V_w$ is a speed of the tube wave in the tubular.

9. The non-transitory machine-readable medium of claim 8, further comprising altering frac operations based at least in part on the Darcy factor of the stage resistance.

10. The non-transitory machine-readable medium of claim 8, further comprising altering treatment parameters such as proppant concentration, pumping rate, or completions design, based at least in part on the Darcy factor or the stage resistance.

11. The non-transitory machine-readable medium of claim 8, wherein the transducer is disposed on the wellhead of the wellbore.

12. The non-transitory machine-readable medium of claim 8, further comprising inverting the pressure.

13. The non-transitory machine-readable medium of claim 8, wherein the time-domain model is a best fit model.

14. The non-transitory machine-readable medium of claim 8, wherein the Darcy factor is found using $$\alpha = \frac{fLQ_0}{2V_wDA},$$

where the $\alpha$ is a pipe friction, f is a friction factor, L is a length of one or more tubulars in the wellbore, $Q_o$ is a flow rate, $V_w$ is a speed of the tube wave in the tubular, D is a diameter of the tubular, and A is an a cross sectional area of the tubular.

15. The non-transitory machine-readable medium of claim 8, wherein the stage resistance is an aggregate resistance of one or more perforations in the wellbore.

16. A system comprising:
a transducer to measure a pressure created by a tube wave at a wellhead; and
an information handling system connected to the transducer and configured to:
create a time-domain model based at least in part on the pressure; and
identify a Darcy factor and a stage resistance based at least in part on the time-domain model, wherein the stage resistance is found using $$R = \frac{RA}{\rho_0 V_w},$$

where R is the stage resistance, R is a resistance in the tubular, A is a cross sectional area of the tubular, $\rho_0$ is a fluid density, and $V_w$ is a speed of the tube wave in the tubular.

17. The system of claim 16, wherein the information handling system is further configured to alter a frac operation based at least in part on the Darcy factor of the stage resistance.

18. The system of claim 16, wherein the transducer disposed on the well head is configured to measure the pressure.

19. The system of claim 16, wherein the transducer disposed on the well head is configured to measure the tube wave.

20. The system of claim 16, wherein the information handling system is configured to alter frac operations based at least in part on the Darcy factor of the stage resistance.

\* \* \* \* \*